Dec. 5, 1950  E. STEFFEN  2,533,150
WHEEL RIDGE LEVELING DEVICE
Filed Sept. 13, 1946
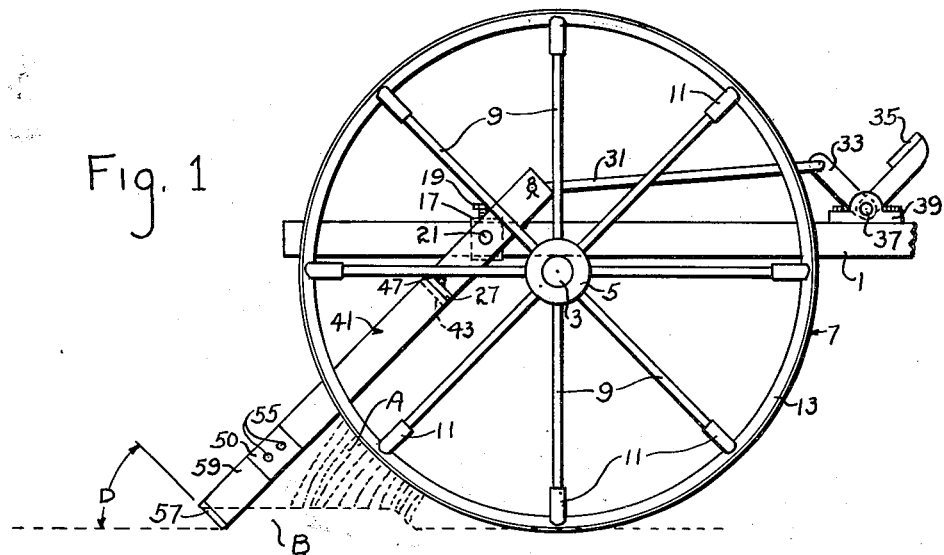
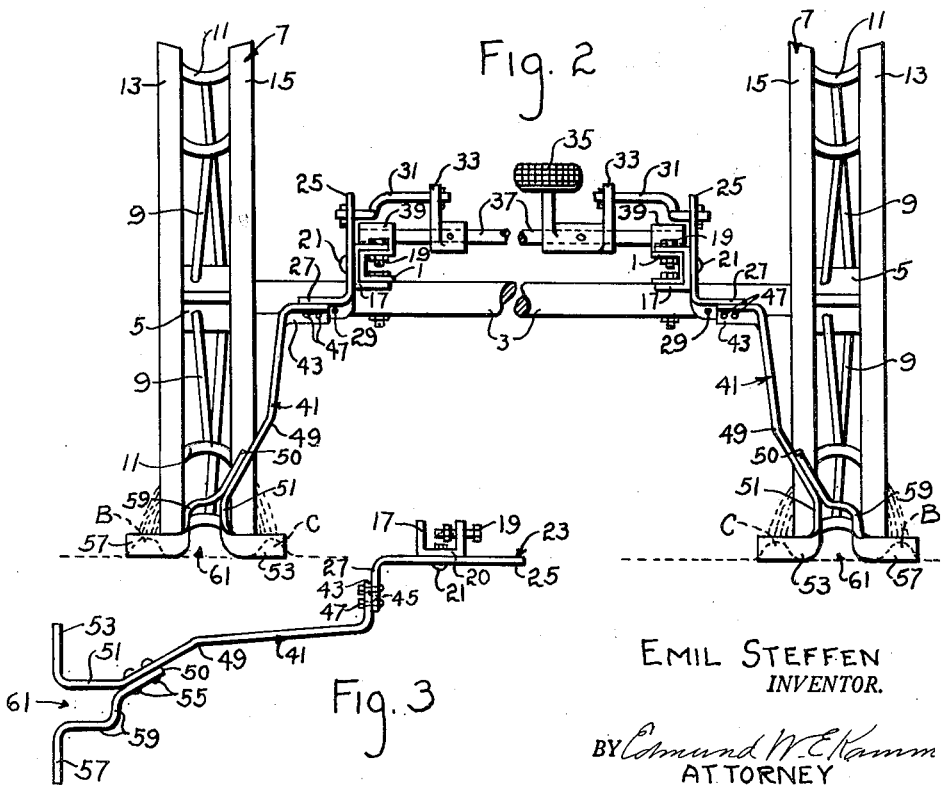
EMIL STEFFEN
*INVENTOR.*
BY Edmund W. E. Kamm
ATTORNEY Patented Dec. 5, 1950

2,533,150

UNITED STATES PATENT OFFICE 2,533,150

WHEEL RIDGE LEVELING DEVICE

Emil Steffen, Adams County, Ind.

Application September 13, 1946, Serial No. 696,909

2 Claims. (Cl. 97—56)

This invention relates to a leveler for a ridge of earth formed by the wheel of a farm vehicle. More specifically, it relates to an attachment for a wheeled vehicle, which is adapted to level the ridges formed by the wheels of the vehicle.

It is well known that the wheels of various farm vehicles used in cultivating and planting will leave ridges of earth on one or both sides of the rut or ruts formed by the wheel. As a general rule, the faster the vehicle is drawn through the field, the higher will be the ridge thrown up by the wheel. With present day speeds of 4 to 5 miles an hour the ridge is a very substantial one. This is especially true of a corn planter in which the wheels are formed of two frusto-conical bands which are axially spaced along the hub of the wheel so as to straddle the furrow in which the seeds are planted. Since this machine operates in fields in which the earth is broken up into rather small bits, the earth through which the vehicle passes pours over the inner surfaces of the bands at the bottom of the wheel, and later is elevated thereby and displaced away from the wheel to form two parallel ridges. If these are left, they will, of course, harden with the action of the elements, and later on when the corn is cultivated, the ridges interfere with the operation of the cultivator and make proper cultivation difficult or even impossible. This is especially true where a rotary hoe is used for the cultivation or where the cultivator has a fender which can ride on the ridge and prevent the cultivator from entering the earth to the proper depth.

It is therefore an object of the invention to provide means for leveling the ridges.

Another object of the invention is the provision of attachments to the vehicle for leveling the ridges formed by the vehicle wheels.

Still another object of the invention is to provide means for leveling the wheel ridges, which are readily attachable to the vehicle.

Yet another object is to provide ridge leveling means which are retractable at will to permit turning or backing the vehicle.

A further object of the invention is to provide on a planter having dual rimmed wheels, means for leveling the ridges formed thereby.

Still another object of the invention is to provide means connected with the seeder plow lifting mechanism for raising the levelers.

These and other objects will become apparent from a study of this specification and the drawings which are attached hereto and made a part hereof, and in which:

Figure 1 is a side elevation of the leveler and lifting mechanism attached to a corn planter.

Figure 2 is a rear elevation of the device of Figure 1, showing the wheel structure, the levelers and the lifting mechanism.

Figure 3 is a top view of the leveler structure and attaching means.

Referring now to Figures 1 and 2, the numeral 1 refers to the frame of the vehicle to which is attached, by any suitable means, an axle 3, the outer ends of which project beyond the frame and are received in the hubs 5 of the wheels designated generally by 7. The hubs are adjustable in and out on the shaft to vary the spacing of the rows. Radiating from the hubs are spokes 9 which are fixed at their outer ends into the central sections of yokes 11. The free ends of the yokes are fixed to the two rims 13 and 15. These rims are frusto-conical in form and have their apices directed toward each other. In other words, the base diameters are disposed at the outsides of the wheel.

The loose earth on either side of the wheel rims as they form a rut, falls upon the inner surfaces of the rims and is carried upwardly to the rear to a region designated generally by A where it is eventually discharged by gravity from the wheel. The earth falls from the large diameters of the rims and forms ridges B and C when the machine is driven at speeds of 4 or 5 miles an hour, as is common where tractors are used for pulling it. As pointed out above, these ridges harden under the action of the weather and interfere with later cultivating operations.

The levelers are formed in complementary pairs and each comprises a C-clamp 17 which is fixed to the frame 1 by means of a bolt 19 which enters a hole in the frame. On the exterior of the vertical leg 20 of the clamp and perpendicular thereto, is mounted a pivot stud 21 on which is pivotally mounted the lever 23 which has one arm 25 parallel to the vertical leg and the other arm 27 bent outwardly perpendicular to the plane of the leg.

The arm 27 is provided with a number of perforations 29. The upper end of arm 25 is perforated to receive a rod 31 which is in turn connected to a lever 33 which is rotated by means of pedal 35 and shaft 37 mounted in suitable bearings 39 on the frame 1. The shaft is also used to lift the seed planting plows (not shown) when the planter is to be turned or backed.

The leveler proper comprises a bar 41 having a thin, flat cross-section having the upper end bent inwardly as at 43 so as to abut the arm 27. Holes 45 are provided in the end 43 so as to receive bolts 47.

From the end 43, the bar extends downwardly, rearwardly and outwardly from the center line of the vehicle until at 49 it is bent outwardly more sharply to bring it to the rear of the inner rim 15. Thence the rod extends substantially straight at 51 and terminates in an inwardly directed, horizontal leveler blade 53.

Fixed, by means of rivets 55 or other suitable means, to that portion of the bar 41 between the point 49 and the section 51 is the shank 50 of the second leveler blade 57 which is adapted to level the ridge formed by the outer rim 13. This blade 57 is aligned with the blade 53 and is connected by an offset section 59 to the shank 50. The blades are thus longitudinally spaced, are coaxial and are substantially parallel to the axle and inclined at about forty-five degrees to the earth with the bottom edge leading. The shank 50, offset portion 59 and section 51 form a yoke which spans the seed row and prevents earth from being thrown on the row and burying the seeds too deeply. The opening 61 formed by the offset is directly over the furrow in which the seeds are planted so that there is no danger of the leveler compacting the earth in the region of the furrow.

Operation

The leveler blades 53—57 when in operative position are disposed at an angle D to the earth so as to scoop up their respective ridges and to spread them laterally, both to the right and left, when viewed from the rear. Thus they tend to fill the wheel ruts and level the ridges.

When the pedal 35 is depressed, the rod 37 rotates and lifts the seed plows (not shown) preparatory to turning or backing the cultivator. At the same time the levers 33 draw forwardly on the rods 31 and rotate the levers 41 in a clockwise direction about the pivot studs 21, thus lifting the leveler blades out of contact with the earth so as to prevent damage to them when the cultivator is backed or turned.

Conversely, when the shaft 37 is rotated to drop the plows, the leveling blades are dropped into operative position.

The bolts 47 are entered into the holes 45—29 which will bring the leveler blades into the proper position with respect to the ridges. If the wheels are moved on the axle to adjust the spacing of the furrows it is necessary to adjust the levelers correspondingly.

It is, of course, obvious that the invention is not limited solely to a planter but may be applied to any vehicle which creates wheel ridges which interfere with subsequent operations.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a wheeled vehicle having a supporting member, the combination of a lever mounted on said member for pivotal movement in a vertical plane substantially parallel to the line of motion of the vehicle, and a leveler bar attached to the lower end of said lever and projecting horizontally behind a wheel of the vehicle and in contact with the earth for filling the wheel rut, said leveler bar comprising a relatively wide, thin, flat blade disposed at right angles to the line of motion of the vehicle at substantially a forty-five degree angle to the earth with the lower edge of the blade projecting in the direction of motion of the vehicle so that earth will spread by flowing along the blade and over it.

2. In a planting vehicle having dual rimmed wheels which produce ridges at one side of each rim and having a supporting member, the combination of a pair of edged leveler bars disposed in coaxial, longitudinally spaced relation to each other, and mounting means on said supporting member connected to position said bars horizontally and transversely at right angles to said ridges at the ground level, said bars being disposed substantially at forty-five degrees to the earth with the lower edge leading, so as to engage and scatter said ridges to fill the ruts left by the rims, said bars being connected at their adjacent ends by a yoke which is attached to the mounting means, said yoke being disposed so as to prevent the movement of earth into the space between the blades.

EMIL STEFFEN.

REFERENCES CITED

The following references are of record in the file of this patent:

UNITED STATES PATENTS

| Number | Name | Date |
|---|---|---|
| 676,476 | Secor | June 18, 1901 |
| 941,951 | Reynolds | Nov. 30, 1909 |
| 979,817 | Allbee | Dec. 27, 1910 |
| 1,234,745 | Fink | July 31, 1917 |
| 1,252,658 | Butler | Jan. 8, 1918 |
| 1,366,915 | Knorr | Feb. 1, 1921 |
| 1,601,306 | Heinse | Sept. 28, 1926 |
| 1,604,721 | Riepe | Oct. 26, 1926 |